United States Patent
Colligan (10) Patent No.: US 6,669,075 B2
(45) Date of Patent: Dec. 30, 2003

(54) TAPERED FRICTION STIR WELDING TOOL

(75) Inventor: Kevin Colligan, Harvest, AL (US)

(73) Assignee: Concurrent Technologies Corporation, Johnstown, PA (US)

( * ) Notice: Subject to any disclaimer, the term of this patent is extended or adjusted under 35 U.S.C. 154(b) by 0 days.

(21) Appl. No.: 10/140,797

(22) Filed: May 7, 2002

(65) Prior Publication Data

US 2003/0209588 A1 Nov. 13, 2003

(51) Int. Cl.[7] ............... B23K 20/12; B23K 37/00; B23K 1/06
(52) U.S. Cl. ............... 228/2.3; 228/2.1; 228/112.1; 228/114.5
(58) Field of Search ............... 228/112.1–114.5, 228/2.1, 2.3

(56) References Cited

U.S. PATENT DOCUMENTS 5,460,317 A * 10/1995 Thomas et al. ............ 228/112.1
5,718,366 A * 2/1998 Colligan .................... 228/112.1
5,794,835 A * 8/1998 Colligan et al. ............. 228/2.1
6,264,088 B1 * 7/2001 Larsson ...................... 228/2.1

FOREIGN PATENT DOCUMENTS

GB 2 306 366 5/1997

* cited by examiner

Primary Examiner—M. Alexandra Elve
Assistant Examiner—Colleen P. Cooke
(74) Attorney, Agent, or Firm—Buchanan Ingersoll PC (57) ABSTRACT

A friction stir welding tool is provided for joining together workpieces utilizing friction stir welding processes. The inventive tool includes a support body rotatable about a first axis and having a distal end defining a shoulder. A rotatable pin extends from the distal end of the support body downward and away from the shoulder. The shoulder of the support body includes at least one section that is tapered, with the taper extending downward toward the pin.

25 Claims, 4 Drawing Sheets

TAPERED FRICTION STIR WELDING TOOL

FIELD OF THE INVENTION

The present invention is directed generally toward friction stir welding and, more particularly, toward an improved tool for use in friction stir welding processes.

BACKGROUND OF THE INVENTION

Friction stir welding is a process that makes use of frictional heat, which includes the heat generated between a rotating, non-consumable pin and workpieces and the heat generated as a result of plastic work from the workpiece material being strained and mixed, to weld the workpieces together. The produced frictional heat plasticizes the workpiece materials and consolidates them to create one piece of material where there were originally two. Friction stir welding is used for joining together various parts of materials, such as metals, plastics, and other materials that will soften and consolidate under applied frictional heat to become integrally connected. While friction stir welding has been commonly applied to butt joints and corner joints, it can also be applied to lap joints and other types of joints, as well as for eliminating or closing cracks in a given material and for joining together two sides of a material to form a hollow section, such as a tube.

Figure 1:
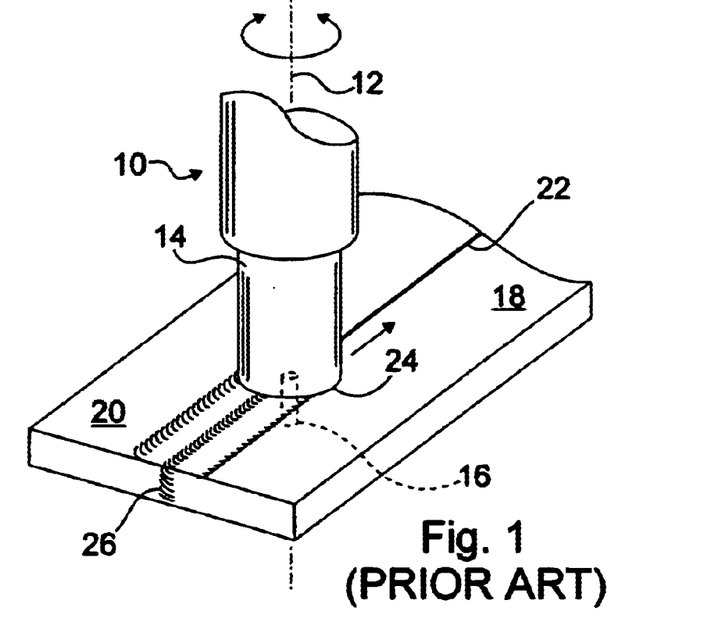
FIG. 1 is a perspective view of a prior art friction stir welding apparatus.

A prior art apparatus for friction stir welding is shown generally in FIG. 1. The apparatus 10 is rotatable about an axis 12, and includes a support body 14 and a non-consumable pin 16 extending from a distal end of the support body 14. As shown in FIG. 1, two workpieces 18 and 20 are aligned so that the edges of the workpieces to be welded together are held in direct contact at an interface 22. As the rotating apparatus 10 is brought into contact with the interface 22 between the workpieces 18 and 20, the rotating pin 16 is forced into contact with the material of both workpieces 18 and 20, as shown in FIG. 1. The pin 16 is inserted into the material of the workpieces 18 and 20 until a flat shoulder 24 at the distal end of the support body 14 contacts the upper surface of the workpieces 18 and 20. As the apparatus 10 is moved through the material, the rotation of the pin 16 in the material and the rubbing of the flat shoulder 24 against the upper surface of the workpieces 18 and 20, as well as the resultant plastic work from the workpiece material being strained and mixed, produces a large amount of frictional heat in the vicinity of the workpiece interface 22. This frictional heat softens the material of the workpieces 18 and 20 in the vicinity of the rotating pin 16 and shoulder 24 creating a plasticized region and causing commingling of the material which, upon hardening, forms a weld 26. As the apparatus 10 is moved longitudinally along the interface 22, the weld 26 is formed along the interface 22 between the workpieces 18 and 20, thereby joining the workpieces 18 and 20 together. The flat shoulder 24 of the support body 14 prevents softened material from the workpieces from escaping upward, and forces the material into the plasticized region. When the weld is completed, the apparatus 10 is removed.

Prior art friction stir welding tools require minimal differences in workpiece thickness across the weld joint. Thus, fluctuations in the thickness of the workpieces at their interface may compromise the integrity of the weld formed by friction stir welding processes. Similarly, prior art friction stir welding tools require that the position of the tool be precisely controlled relative to the upper surface of the workpieces in order to generate sufficient frictional heat to adequately plasticize the material. Failure to generate sufficient frictional heat will also compromise the integrity of the weld joint.

Additionally, for prior art bobbin-type friction stir welding tools, the pin and back shoulder must be precisely controlled relative to the back surface of the workpieces. Thus, the pin must be independently movable axially relative to the front shoulder, e.g., support body 14, of the friction stir welding tool.

The present invention is directed toward overcoming one or more of the above-mentioned problems.

SUMMARY OF THE INVENTION

A friction stir welding tool is provided, according to the present invention, for joining together workpieces utilizing friction stir welding processes. The inventive tool includes a support body rotatable about a first axis and having a distal end defining a shoulder. A rotatable pin extends from the distal end of the support body downward from the shoulder. The shoulder of the support body includes at least one section that is tapered, with the taper extending downward toward the pin.

In one form of the present invention, the shoulder includes a face having at least one groove formed therein. The at least one groove may include either a spiral formed groove or a plurality of concentric grooves formed in the face of the shoulder.

In another form of the present invention, the shoulder includes a substantially flat section and a tapered section having a taper extending downward toward the pin. The substantially flat and tapered sections are concentric and displaced radially from the pin to the outer edge of the support body. Preferably, the substantially flat section is provided adjacent the pin, and the tapered section is provided adjacent the outer edge of the support body. However, an opposite arrangement of the sections may be utilized.

In yet another form of the present invention, the shoulder includes first and second tapered sections. The first tapered section has a first taper extending downward toward the pin. The first taper is formed at a first angle referenced from a plane perpendicular to the first axis. The second tapered section has a second taper also extending downward toward the pin. The second taper is formed at a second angle, greater than the first angle, referenced from a plane perpendicular to the first axis. The first and second tapered sections are concentric and displaced radially from the pin to the outer edge of the support body. Preferably, the first tapered section is provided adjacent the pin, and the second tapered section is provided adjacent the outer edge of the support body. However, an opposite arrangement of the sections may be utilized.

In still another form of the present invention, the shoulder additionally includes a third tapered section having a third taper extending downward toward the pin. The third taper is formed at a third angle, different than the first and second angles, referenced from a plane perpendicular to the first axis. The first, second and third tapered sections are concentric and displaced radially from the pin to the outer edge of the support body. Preferably, the second angle is greater than both the first and third angles, with the first tapered section provided adjacent the pin, the third tapered portion provided adjacent the outer edge of the support body, and the second tapered section provided between the first and third tapered sections However, alternate arrangements of the sections may be utilized.

The third angle may be greater than or equal the first angle. In a further form of the present invention, the first angle is substantially 0°, such that the first tapered portion is substantially flat.

In an additional form of the present invention, each of the first, second, and third tapered sections includes a face having at least one groove formed therein. The at least one groove formed in each of the first, second and third section faces may include either a spiral formed groove or a plurality of concentric grooves. In one form, the grooves are formed normal to the respective planes of the first, second and third section faces.

In an alternate embodiment of the present invention, the friction stir welding tool further includes a bottom support member connected to a distal end of the pin, such that the pin is disposed between the support body and the bottom support member. In this embodiment, the inventive tool is configured as a bobbin-type friction stir welding tool. The bottom support member is also rotatable about the first axis and includes a bottom shoulder facing the shoulder of the support body. The bottom shoulder of the bottom support member includes at least one portion that is tapered, with the taper extending upward toward the pin.

In one form of the alternate embodiment, the tapering is such that the shoulder of the support body and the bottom shoulder of the bottom support member are formed as mirror images of one another.

In another form of the alternate embodiment, the bottom shoulder includes a face having at least one groove formed therein. The at least one groove may include either a spiral formed groove or a plurality of concentric grooves formed in the face of the bottom shoulder.

With the inventive tool configured as a bobbin-type welding tool, the support body, pin and bottom support member may be integrally formed, or connected via conventional connection means.

It is an object of the present invention to provide a friction stir welding tool having an improved tolerance to joint mismatch at the interface of the workpieces to be joined.

It is a further object of the present invention to provide a friction stir welding tool having increased heat generation properties.

It is yet a further object of the present invention to provide a friction stir welding tool having robust operational properties of the welding process.

It is still a further object of the present invention to provide a friction stir welding tool capable of facilitating fixed-pin bobbin-type welds.

Other objects, aspects and advantages of the present invention can be obtained from a study of the specification, the drawings, and the appended claims.

DETAILED DESCRIPTION OF THE INVENTION

Figure 2:
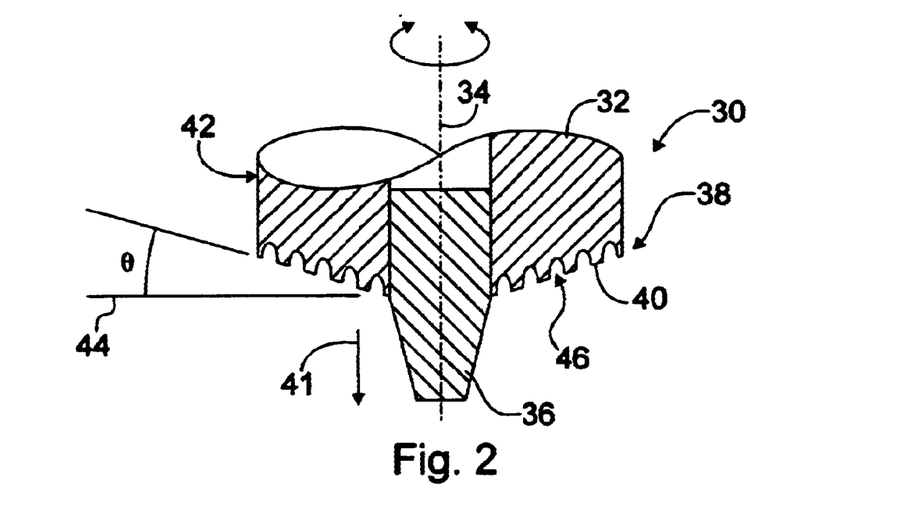
FIG. 2 is a section view of a friction stir welding tool according to the present invention.

Referring to FIG. 2, a friction stir welding tool according to the present invention is shown generally at 30. The friction stir welding tool 30 includes a support body 32 rotatable about an axis 34, and a non-consumable pin 36 attached to the support body 32 and extending from an end 38 of the support body 32. The end 38 of the support body 32 defines a shoulder 40, with the pin 36 extending from the end 38 of the support body 32 downward and away from the shoulder 40 in the direction of arrow 41. Typically, the support body 32 is circular in cross-section and the pin 36 is centered therein, such that the pin 36 also rotates about the axis 34. However, the pin 36 may be offset from the center of the support body 32 without departing from the spirit and scope of the present invention.

As shown in FIG. 2, the shoulder 40 is tapered, with the taper extending from an outer edge 42 of the support body 32 downward in the direction of arrow 41 toward the pin 36 at an angle θ referenced from a plane 44 perpendicular to the axis 34. Additionally, the tapered shoulder 40 includes a plurality of grooves 46 machined into a face of the shoulder 40. The grooves 46 are commonly known in the friction stir welding art as a scroll shoulder. The grooves 46 may be machined into the face of the shoulder 40 as a spiral formed groove or as a plurality of concentric grooves and, additionally, may be machined normal to the face of the shoulder 40.

Figure 3:
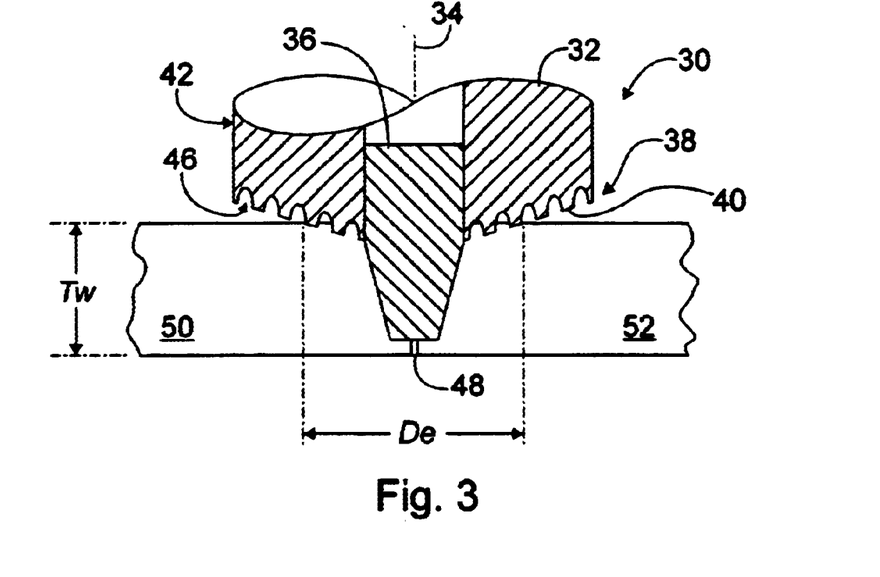
FIG. 3 is a section view of the friction stir welding tool of FIG. 2 in use.

The support body 32 and pin 36 are typically made of a material harder than the workpiece material to be joined. As shown in FIG. 3, the pin 36 is inserted into a joint region, or interface, 48 between two workpieces 50 and 52 to be joined, with the shoulder 40 contacting the upper surfaces of the workpieces 50 and 52. Rotation of the friction stir welding tool 30 about the axis 34 results in the generation of frictional heat, which includes the heat generated between the friction stir welding tool 30 (specifically the pin 36 and shoulder 40) and the workpieces 50 and 52 and the heat generated as a result of plastic work from the workpiece material being strained and mixed, causing the workpieces 50 and 52 to become plasticized in a region near the interface 48. As the friction stir welding tool 30 is translated along the interface 48, the workpieces 50 and 52 are plasticized and then harden to form a weld and join the workpieces 50 and 52 together. The friction stir welding process has been utilized to join a wide range of materials, including metals and alloys, reinforced metals such as MMCs (metal matrix composites), and thermoplastic type materials. Friction stir welding is commonly applied to butt joints and corner joints, although the process can be used to join lap joints and other types of joints, as well as for closing cracks in materials.

The tapered shoulder design of the invenitive tool 30 offers several advantages over prior art friction stir welding tools, as can be seen from FIG. 3. First, the inventive design results in the welding tool 30 having a variable effective diameter $D_e$. Prior art friction stir welding tools having a flat shoulder are typically constructed with different fixed shoulder diameters depending on the material thickness, pin diameter, and other factors. However, the tapered shoulder design of the inventive tool 30 can produce a variable effective diameter $D_e$ simply by changing the depth of penetration of the welding tool 30 into the workpieces 50 and 52. Increasing the depth of penetration of the tool 30 into the workpieces 50 and 52 will increase the effective diameter $D_e$. Similarly, reducing the depth of penetration of the tool 30 into the workpieces 50 and 52 will reduce the effective diameter $D_e$. This increase or decrease in the effective diameter $D_e$ can be done "on the fly" as the welding tool 30 is translated along the interface 48.

A second advantage of the tapered shoulder design is that the welding tool 30 can accommodate variations in material thickness or unplanned variations in the plunge depth (depth of penetration) of the tool 30 into the workpieces 50 and 52 with little or no change in the quality of of the weld, at least as far as the upper portion of the weld is concerned. Typically, with prior art friction stir welding tools, it is extremely important that the spatial relationship between the welding tool and the surface of the workpieces be maintained within a very small tolerance. If the workpiece material should reduce in thickness along the joint interface, then the shoulder of a conventional friction stir welding tool may lift off of the upper surface of the workpieces, resulting in an immediate and large defect in the resultant weld. On the other hand, if the workpiece thickness increases along the joint interface as a result of normal variations, the leading edge of the shoulder of a conventional welding tool can plunge beneath the surface of the workpieces producing excess flash and reducing the thickness of the workpieces. However, as can be seen from FIG. 3, should the workpiece 50, 52 thickness $T_w$ increase or decrease, the inventive tool 30 will simply proceed with a variable effective shoulder diameter $D_e$ depending on the depth of penetration of the tool 30 relative to the top surface of the workpieces 50 and 52. The effective diameter $D_e$ will increase or decrease proportionally with the thickness $T_w$ of the workpieces. To ensure proper operation of the inventive tool 30, one must only maintain the gap between the end of the pin 36 and the anvil (not shown) and ensure that the length of the tapered shoulder 40 is adequate to accommodate any normal variations, or any design variations, in the thickness of the workpieces 50 and 52.

A third advantage of the inventive design is the increased flow of plasticized material and the increased frictional heat generated by the grooves 46 formed in the shoulder 40. Normally, in prior art friction stir welding tools, the scroll grooves are fed only by workpiece material that is "kicked up" by the advancing pin of the welding tool. With the tapered shoulder design of the present invention, the downward taper of the shoulder 40 forces workpiece material into the advancing grooves over the full effective diameter $D_e$, making the scroll much more effective in stirring workpiece material and in generating frictional heat to plasticize the material, thus forming a better overall weld. While the angle $\theta$ may virtually be any angle, in one form, the angle $\theta$ ranges from about 1° to about 60°. However, other taper angles are contemplated and may be utilized without departing from the spirit and scope of the present invention.

Figure 4:
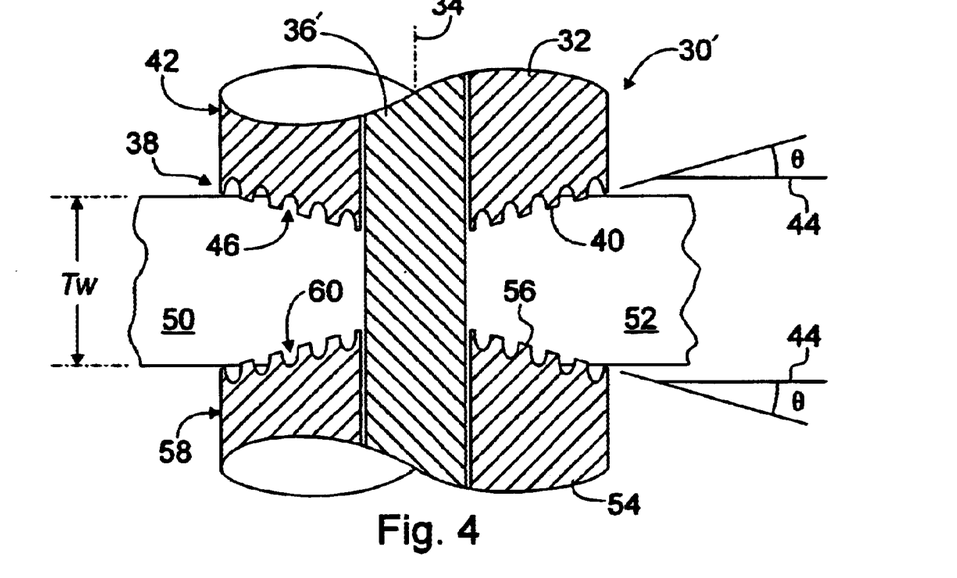
FIG. 4 is a section view of a friction stir welding tool according to the present invention implemented as a bobbin-type welding tool.

Finally, an additional advantage of the tapered shoulder design of the present invention is that it facilitates a bobbin-type friction stir welding tool, shown generally shown at 30' in FIG. 4, also known as self-reacting welding tool. In FIG. 4, like elements of FIG. 2 are indicated with the same reference number, while elements requiring modification are indicated with a prime ('). The welding tool 30' shown in FIG. 4 includes a bottom support member 54 connected to a distal end of the pin 36'. The bottom support member 54 is spaced from the support body 32 and includes a bottom shoulder 56 facing the shoulder 40 of the support body 32, such that the pin 36' is disposed between the support body 32 and the bottom support member 54. The bottom shoulder 56 is also tapered, with the taper extending from an outer edge 58 of the bottom support member 54 upward in the direction of arrow 59 toward the pin 36' at an angle $\phi$ from the plane 44 perpendicular to the axis 34. Additionally, the bottom shoulder 56 includes grooves 60 machined in a face thereof similar to the grooves machined in the shoulder 40 of the upper body 32.

In one form, the taper angles of the shoulders 40 and 56 are equal, such that angle $\theta$=angle $\phi$. In this case, the shoulder 40 and bottom shoulder 56 of the tool 30' are formed as mirror images of one another. However, different taper angles $\theta$ and $\phi$ may be utilized for the shoulders 40 and 56, respectively, without departing from the spirit and scope of the present invention.

The inventive tool 30' shown in FIG. 4 does not require an active relative motion relationship between the support body 32 and the bottom support member 54, except possibly at the initial start up of the friction welding process. The pin 36' can be fixedly attached to both the support body 32 and the bottom support member 54 with no relative movement occurring therebetween. This is possible due to the tapered shoulders 40 and 56, which can accomplish welds with little regard to the depth of penetration into the workpieces 50 and 52. The support body 32 and the bottom support member 54 do not have to be actuated to move relative to the pin 36' to accommodate variations in the workpiece thickness $T_w$. The fixed shoulder bobbin tool 30' shown in FIG. 4 can simply be controlled to maintain the center of the pin 36' roughly in the center of the workpiece thickness $T_w$. Small variations in the workpiece thickness $T_w$ will automatically be accommodated by the tapered shoulders 40 and 56, resulting in little or no defects in the resultant weld. The support body 32, pin 36' and bottom support member 54 may be integrally formed or connected via conventional connection means.

The friction stir welding tool 30 according to the present invention has been tested and was found to produce good welds. One weld was made in material that had a 0.03" variation in thickness over its length. Utilizing conventional friction stir welding tools, this variation in thickness would make it difficult to produce a good weld joint. However, the friction stir welding tool 30 of the present invention produced a weld that simply had a variable weld crown width, with the width depending on the local material thickness. The plunge depth of the tool 30 was set to a value that would give the proper gap between the end of the pin 36 and the anvil, and the tapered shoulder profile of the weld tool 30 produced a variable width weld in response to the changing workpiece thickness along the length of the weld. Additional testing with workpieces that had a 0.03" mismatch (one side thicker than the other) also illustrated that the inventive weld tool 30 can accommodate such mismatch without producing any flash or expelled material, provided that the mismatch not exceed the vertical length of the tapered section.

Figure 5:
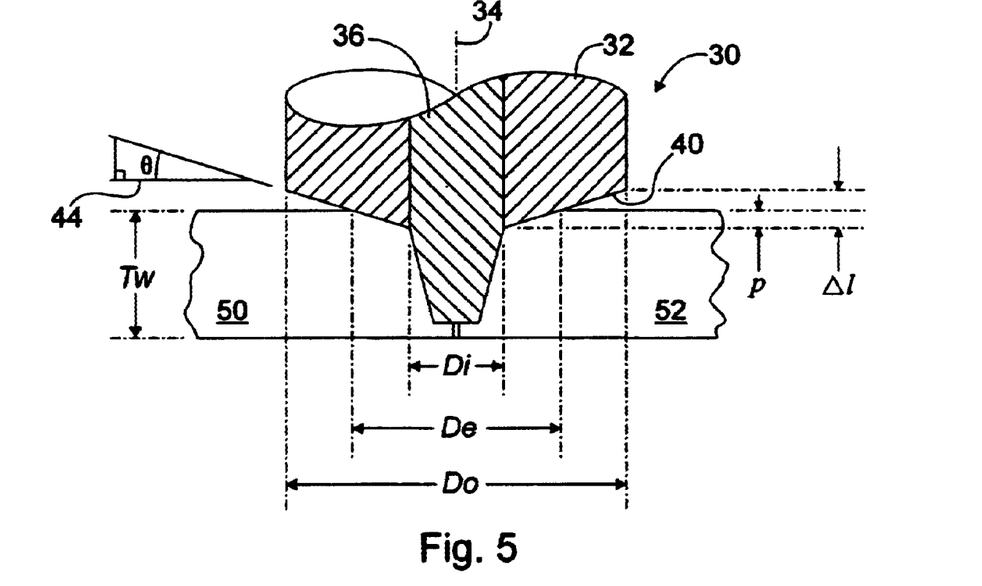
FIG. 5 is a section view of the friction stir welding of FIG. 2, with the scroll omitted, illustrating various diameters and parameters associated therewith.

Referring to FIG. 5, which is the welding tool 30 of FIG. 3 with the grooves 46 omitted, the tapered shoulder 40 of the welding tool 30 can generate different effective diameters $D_e$ based upon various parameters. As shown in FIG. 5, the tapered shoulder 40 has an outer diameter $D_o$, an inner diameter $D_i$, and an effective diameter $D_e$ which is defined by the interface of the tapered shoulder 40 and the upper surface of the workpieces 50 and 52. The tapered shoulder 40 extends into the workpieces 50 and 52 a plunge depth p, has a vertical length $\Delta l$, and a taper angle $\theta$. Using these parameters, the effective diameter $D_e$ of the tapered shoulder 40 can be calculated as follows:

$$\tan\theta = \frac{\Delta l}{\frac{(D_o - D_i)}{2}} = \frac{2\Delta l}{(D_o - D_i)} \quad (1)$$

$$D_e = D_i + 2\frac{p}{\tan\theta} \quad (2)$$

Combining Equations (1) and (2), the effective diameter $D_e$ generated by the tapered shoulder 40 can be calculated according to the following equation:

$$D_e = D_i + \frac{p(D_o - D_i)}{\Delta l} \quad (3)$$

In order for the friction stir welding tool 30 to be able to generate effective welds in workpiece material that has a large variation in plunge depth p without a large change in the effective diameter $D_e$, it would generally be desirable to construct the tool 30 with a shoulder 40 having a large vertical taper length $\Delta l$. This property can be seen by taking the derivative of the effective diameter $D_e$ with respect to the plunge depth p:

$$\frac{d}{dp}D_e = \frac{(D_o - D_i)}{\Delta l} \quad (4)$$

Typically, the inner diameter $D_i$ is fixed by the diameter of the pin 36 or the diameter of its shank, for the inventive tool 30 profile. Thus, to reduce variations in effective diameter $D_e$ with respect to the plunge depth p, it is evident from Equation 4 that having a large vertical taper length $\Delta l$ achieves this goal.

Figure 6:
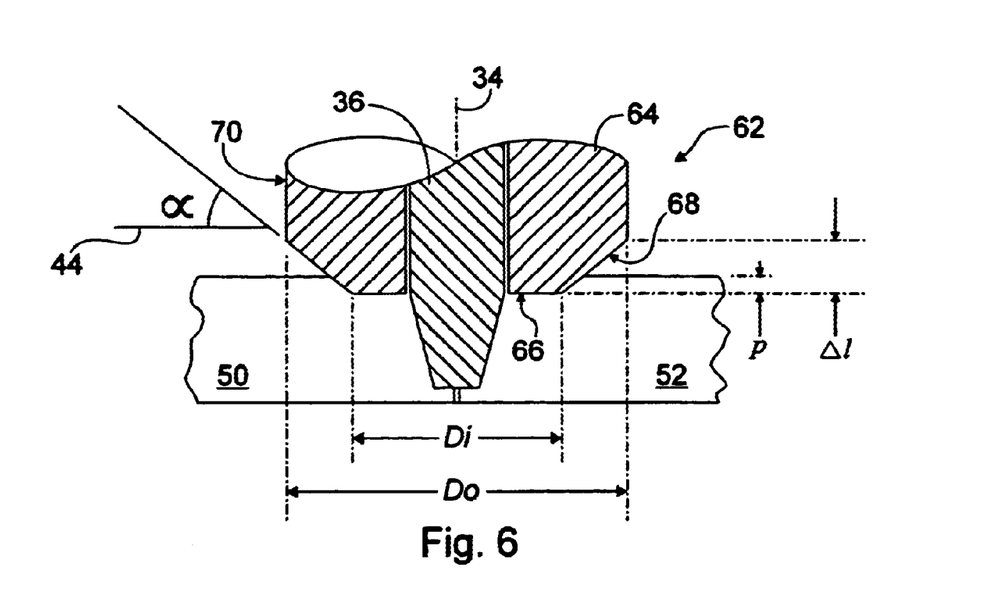
FIG. 6 is a section view of a friction stir welding tool according to an additional form of the present invention.

Other tool profiles can be derived from the general tapered shoulder concept. As shown in FIG. 6, with like elements of FIG. 5 indicated with the same reference number, a friction stir welding tool 62 is illustrated including a support body 64 having first 66 and second 68 concentric shoulder sections extending from the pin 36 to an outer edge 70 of the support body 64. The first shoulder section 66 is illustrated as being substantially flat, while the second shoulder section 68 is tapered, with the taper extending from the outer edge 70 of the support body 64 downward toward the pin 36 at an angle α referenced from the plane 44 perpendicular to the axis 34. The second shoulder section 68 has a relatively large taper angle α, and thus a relatively large vertical taper length $\Delta l$. The dual-section design of FIG. 6 takes into account that it is not desirable to have a very large vertical taper length $\Delta l$, especially for thin workpieces, since this would detract from the welding effect of the pin 36. However, it is desirable to have a steep taper angle, and thus a relatively large vertical taper length $\Delta l$, in order to reduce the effects of variations in the plunge depth p on the effective diameter $D_e$ of the tool 62. The profile illustrated in FIG. 6 accomplishes this. While the angle α may virtually be any angle, in one form, the angle α ranges from about 1° to about 60°. However, other taper angles are contemplated and may be utilized without departing from the spirit and scope of the present invention. Additionally, while the first shoulder section 66 is illustrated in FIG. 6 as being substantially flat, it may also be tapered downward toward the pin 36 at an angle typically less than the taper angle α of the second shoulder section 68. Further, while not shown in FIG. 6, either, or both, of the shoulder sections 66 and 68 may include spiral or concentric grooves (not shown) machined into the respective faces. Further, the grooves may be machined such that they are normal to the respective face of each section 66 and 68.

Figure 7:
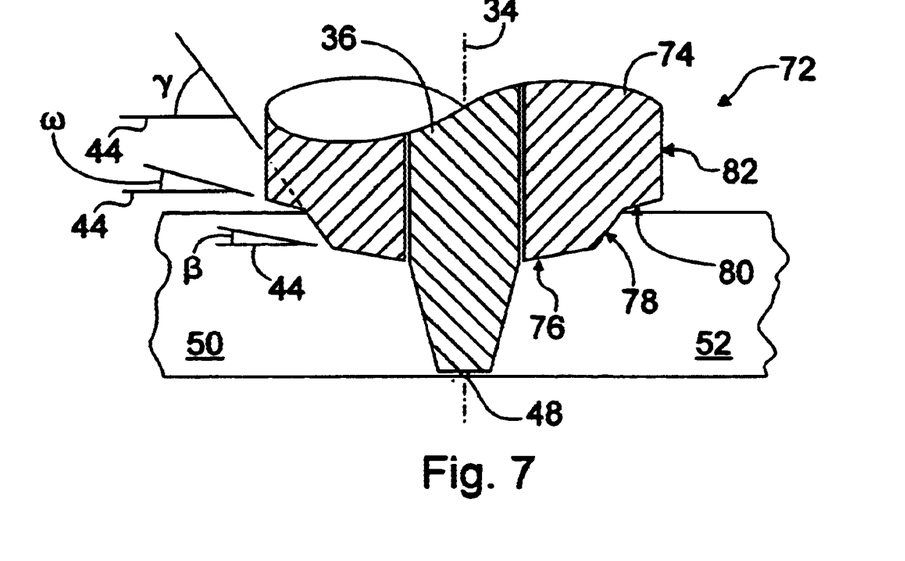
FIG. 7 is a section view of a friction stir welding tool according to a further form of the present invention.

Another tool profile, illustrated in FIG. 7, with like elements of FIG. 5 indicated with the same reference number, derives from the fact that a shallow tape profile results in a large variation in plunge force. This would be useful in a load-controlled welding situation for preventing excessive plunge. The friction stir welding tool 72 shown in FIG. 7 is designed for such use. The tool 72 includes a support body 74 having first 76, second 78 and third 80 concentric shoulder sections extending radially from the pin 36 to an outer edge 82 of the support body 74. Each of the shoulder sections 76, 78 and 80 is tapered, with the tapers extending downward toward the pin 36 at a taper angle referenced from the plane 44 perpendicular to the axis 34. As shown in FIG. 7, the first shoulder section 76 includes a taper angle β, the second shoulder section 78 includes a taper angle γ, and the third shoulder section 80 includes a taper angle ω. Typically angle γ will be greater than either angle ω or angle β. The taper angle ω of the third shoulder section 80 will typically be relatively low to protect from excessive plunge. As the plunge depth of the welding tool 72 increases in response to various factors the low tapered shoulder section 80 causes the plunge force requirement to increase rapidly with respect to the plunge depth because of the increased area of the shoulder section 80 in contact with the workpieces 50 and 52. This increase will take place over a small change in plunge depth due to the small taper in shoulder section 80, resulting in a more stable penetration depth. Taper angle ω and taper angle β may be equal to one another or different, depending on various applications. Further, the first shoulder section 76, while shown tapered in FIG. 7, may be substantially flat. Additionally, each of the shoulder sections 76, 78 and 80 may include spiral or concentric grooves (not shown) machined therein. Further, the grooves may be machined normal to the respective face of each section 76, 78 and 80.

Figure 8:
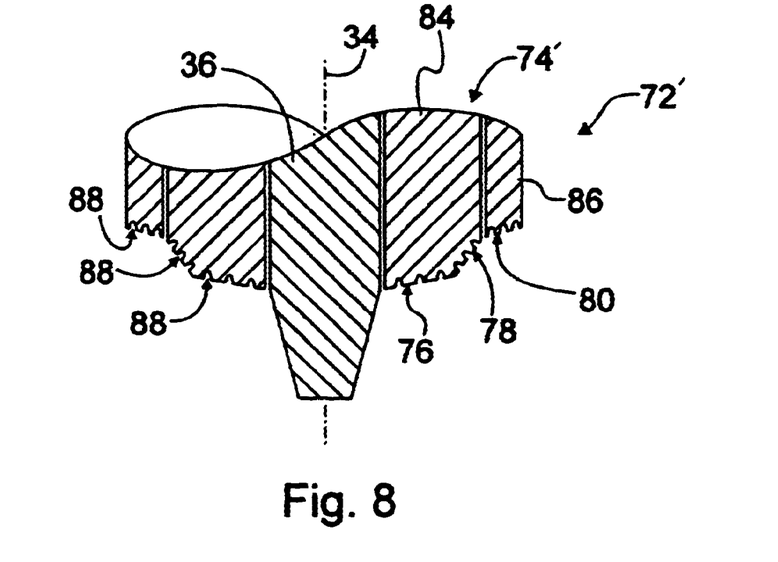
FIG. 8 is a section view of a multiple piece friction stir welding tool according to yet a further form of the present invention.

To facilitate construction of the various tapered sections of the welding tool 72 shown in FIG. 7, such a tool may be constructed from two pieces as shown in FIG. 8. The welding tool 72' shown in FIG. 8 includes a support body 74' including first 84 and second 86 sections. The first section 84 includes shoulder sections 76 and 78, while the second section 86 includes the shoulder section 80. The first 84 and second 86 sections may be conventionally attached. As shown in FIG. 8, each shoulder section 76, 78 and 80 includes grooves 88 machined therein. The grooves 88 may be spiral formed or concentric grooves and additionally may be machined normal to the respective face of each section 76, 78 and 80.

While the present invention has been described with particular reference to the drawings, it should be understood that various modifications could be made without departing from the spirit and scope of the present invention.

I claim:

1. A friction stir welding tool comprising:
   a support body rotatable about a first axis, the support body having an end defining a shoulder; and
   a rotatable pin extending from the end of the support body downward from the shoulder,
   wherein the shoulder of the support body is tapered, with the taper extending from an outer edge of the support body downward toward the pin, and wherein the tapered shoulder includes a face having at least one groove formed therein.

2. The friction stir welding tool of claim 1, wherein the at least one groove is selected from the group consisting of a spiral formed groove and a plurality of concentric grooves.

3. The friction stir welding tool of claim 1, wherein the taper of the support body shoulder is formed at an angle ranging from 1 to 60 degrees from a plane perpendicular to the first axis.

4. A friction stir welding tool comprising:
a support body rotatable about a first axis, the support body having an end defining a shoulder; and
a rotatable pin extending from the end of the support body downward from the shoulder,
wherein the shoulder of the support body includes at least one section that is tapered, with the taper extending downward toward the pin, wherein the shoulder includes a face having at least one groove formed therein.

5. The friction stir welding tool of claim 4, wherein the at least one groove is selected from the group consisting of a spiral formed groove and a plurality of concentric grooves.

6. A friction stir welding tool comprising:
a support body rotatable about a first axis, the support body having an end defining a shoulder; and
a rotatable pin extending from the end of the support body downward from the shoulder,
wherein the shoulder of the support body includes at least one section that is tapered, with the taper extending downward toward the pin, and
wherein the shoulder includes (a) a substantially flat section and (b) a tapered section having a taper extending downward toward the pin, the substantially flat and tapered sections being concentric and displaced radially from the pin to an outer edge of the support body.

7. The friction stir welding tool of claim 6, wherein the substantially flat section is provided adjacent the pin, and the tapered section is provided adjacent the outer edge of the support body.

8. A friction stir welding tool comprising:
a support body rotatable about a first axis, the support body having an end defining a shoulder; and
a rotatable pin extending from the end of the support body downward from the shoulder,
wherein the shoulder of the support body includes at least one section that is tapered, with the taper extending downward toward the pin, and
wherein the shoulder includes a first tapered section having a first taper extending downward toward the pin and formed at a first angle from a plane perpendicular to the first axis, and a second tapered section having a second taper extending downward toward the pin and formed at a second angle, different from the first angle, from a plane perpendicular to the first axis, the first and second sections being concentric and displaced radially from the pin to an outer edge of the support body.

9. The friction stir welding tool of claim 8, wherein the second angle is greater than first angle, and wherein the first tapered section is provided adjacent the pin, and the second tapered section is provided adjacent the outer edge of the support body.

10. The friction stir welding tool of claim 8, wherein the shoulder further includes a third tapered section having a third taper extending downward toward the pin and formed at a third angle from a plane perpendicular to the first axis, the first, second and third tapered sections being concentric and displaced radially from the pin to the outer edge of the support body.

11. The friction stir welding tool of claim 10, wherein the second angle is greater than the first and third angles, and wherein the first tapered section is provided adjacent the pin, the third tapered section is provided adjacent the outer edge of the support body, and the second tapered section is provided between the first and third tapered sections.

12. The friction stir welding tool of claim 11, wherein the third angle is greater than or equal to the first angle.

13. The friction stir welding tool of claim 11, wherein the third angle is greater than the first angle, and wherein the first angle is substantially zero degrees such that the first tapered section comprises a substantially flat section.

14. The friction stir welding tool of claim 10, Wherein each of the first, second and third tapered sections include a face having at least one groove formed therein.

15. The friction stir welding tool of claim 14, wherein the at least one groove formed in each of the first, second and third faces is selected from the group consisting of a spiral formed groove and a plurality of concentric grooves.

16. The friction stir welding tool of claim 15, wherein the at least one groove formed in each of the first, second and third faces is formed normal to respective planes of the first, second and third faces.

17. The friction stir welding tool of claim 4, further comprising a bottom support member connected to a distal end of the pin such that the pin is disposed between the support body and the bottom support member, wherein the bottom support member is rotatable about the first axis and includes a bottom shoulder facing the shoulder of the support body, and wherein the bottom shoulder of the bottom support member includes at least one portion that is tapered, with the taper extending from an outer edge of the bottom support member upward toward the pin.

18. The friction stir welding tool of claim 17, wherein the bottom shoulder includes a face having at least one groove formed therein, the at least one groove selected from the group consisting of a spiral formed groove and a plurality of concentric grooves.

19. The friction stir welding tool of claim 17, Wherein the support body, pin and bottom support member are integrally formed.

20. The friction stir welding tool of claim 17, wherein the shoulder of the support body and the bottom shoulder of the bottom support member are formed as mirror images of one another.

21. A friction stir welding tool comprising:
a support body rotatable about an axis, the support body having an end defining a shoulder;
a rotatable pin extending from the end of the support body downward from the shoulder; and
a bottom support member connected to a distal end of the pin such that the pin is disposed between the support body and the bottom support member, wherein the bottom support member is rotatable about the axis and includes a bottom shoulder facing the shoulder of the support body, and wherein at least one of the bottom shoulder of the bottom support member and the shoulder of the support body includes at least one portion that is tapered,
wherein if the bottom shoulder of the bottom support member is tapered, the taper extends from an outer edge of the bottom support member upward toward the pin, wherein the tapered bottom shoulder includes a face having at least one groove formed therein, and
wherein if the shoulder of the support body is tapered, the taper extends from an outer edge of the support body downward toward the pin, wherein the tapered shoulder includes a face having at least one groove formed therein.

22. The friction stir welding tool of claim 6, where each of the substantially flat section and the tapered section include a face having at least one groove formed therein.

23. The friction stir welding tool of claim 22, wherein the at least one groove is selected from the group consisting of a spiral formed groove and a plurality of concentric grooves.

24. The friction stir welding tool of claim 8, where each of the first and second tapered sections include a face having at least one groove formed therein.

25. The friction stir welding tool of claim 24, wherein the at least one groove is selected from the group consisting of a spiral formed groove and a plurality of concentric grooves.

* * * * *